March 29, 1966 H. STERNHEIM 3,243,527

TELEPHONE DISINFECTOR AND DEODORIZER

Filed Feb. 4, 1963

INVENTOR.
HENRY STERNHEIM
BY
G. B. Schlessel
ATTORNEY

United States Patent Office 3,243,527

Patented Mar. 29, 1966

3,243,527

TELEPHONE DISINFECTOR AND DEODORIZER

Henry Sternheim, 801 W. 181st St., New York, N.Y.

Filed Feb. 4, 1963, Ser. No. 255,899

4 Claims. (Cl. 179—185)

This invention relates to the field of sanitation and health preservation, and has for its objective the provision of attachments to the receivers and transmitters of standard telephone instruments which are capable of effectively destroying germs and bacteria deposited thereon by infected persons, thus preventing the transmission of diseases, as well as eliminating offensive odors resulting from such contamination.

As is well known, telephone instruments, and particularly public telephones, are generally used by large and successive numbers of persons, often strangers to each other. Each user in turn presses the receiver to his ear and talks into the transmitter, or mouthpiece, with his mouth in fairly close contact therewith. The warm, humid breath of the user is directed on to the mouthpiece where it condenses and deposits germs and bacteria from the user's mouth. The user may be suffering from a serious and infectious disease, and dangerous disease germs may be so deposited, to infect subsequent users of the telephone instrument. Even when not dangerous, the germs and bacteria normally present in human mouths create unpleasant and offensive odors, to which succeeding telephone users are subjected. It often happens, too, that persons with ear infections transmit infectious germs to the receivers, or earpieces, of telephones, and these germs are capable of transmission to successive users of the same telephone when they in turn press their ears against such infected receivers.

It is the principal object of my invention, therefore, to provide a disinfecting and deodorizing device for direct attachment to the transmitters and receivers of standard telephone instruments which will effectively destroy all germs and bacteria coming into contact therewith, as well as eliminate the offensive odors resulting from such contamination.

A second important object of my invention is the provision of a disinfecting and deodorizing device for attachment to telephone transmitters and receivers which are provided with filter elements that are easily replaceable at insignificant cost.

A third important object of my invention is the provision of a disinfecting and deodorizing device for attachment to telephone transmitters and receivers which are inexpensive to manufacture and simple to install.

These and other salient objects, advantages and functional features of my invention, together with the novel features of construction, composition and arrangement of parts, will be more readily apparent from an examination of the following description, taken with the accompanying drawings, wherein.

Similar reference characters designate similar parts throughout the different views.

Figures 1, 2, 3, 4:
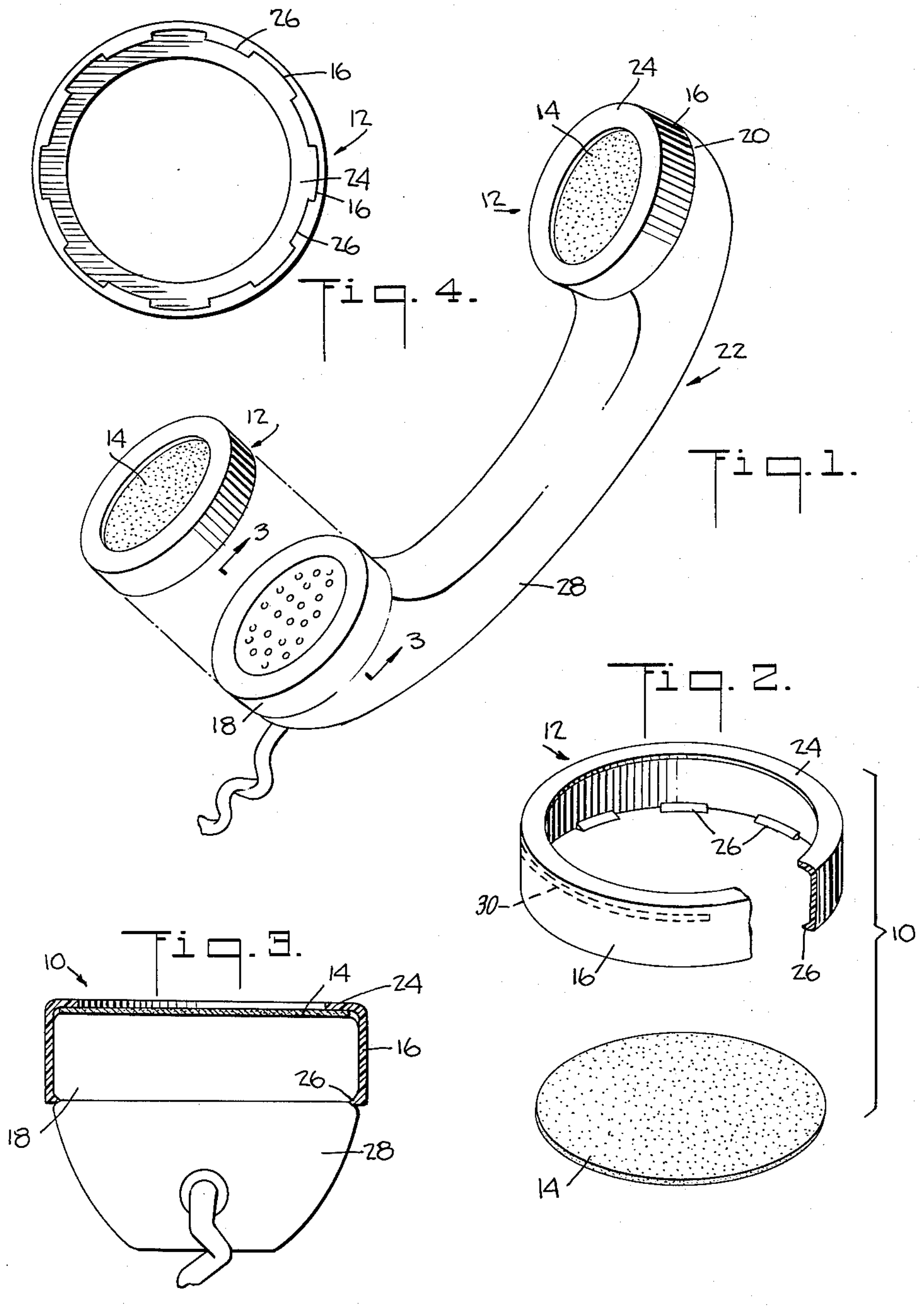
FIG. 1 is a side perspective of a telephone instrument showing a preferred embodiment of my invention showing same attached to the transmitter and receiver thereof, the embodiment of the transmitter being spaced from the transmitter for clarity.
FIG. 2 is an enlarged exploded perspective view of the embodiment of FIG. 1, partly broken away to show details.
FIG. 3 is an enlarged cross-sectional view, taken on lines 3—3 of FIG. 1.
FIG. 4 is a bottom view of the cap portion of the embodiment shown in FIG. 3.

Illustrative of the embodiment shown, my disinfector and deodorizer 10 comprises a cap 12, which is made preferably of a clear plastic material, although any other equally suitable material may serve as well, and a filter element 14. The cap 12 comprises a circular band 16, of a diameter to fit snugly around the standard mouthpiece 18 or earpiece 20 which are secured to the ends of a standard telephone instrument 22, such as is shown in FIG. 1. The cap 12 is slightly wider than the width of the standard telephone transmitter, or mouthpiece 18, or earpiece 20, and is provided with a peripheral lip 24 around one edge thereof, and a plurality of beads 26 around other edge, so that when the cap 12 is pressed upon either the mouthpiece 18 or the earpiece 20 the beads 26 will lock the cap 12 upon the mouthpiece 18 or earpiece 20 by recessing behind the back edge of the latter in its engagement with the body 28 of the telephone instrument 22, as shown in FIG. 3, with the lip 24 in tight engagement against the upper surface of the mouthpiece 18 or earpiece 20.

The filter element 14 is composed of a porous paper, or other similar fibrous material, which has been impregnated with germicidal and deodorizing chemicals, as is well known in the art, such as hexachlorophene, menthol, and the like, the particular germicidal and deodorizing chemicals not being further described since the invention is not restricted to any particular chemical compound. The filter 14 is substantially of the same diameter as the inner circumference of the band 16, so that when the filter 14 is inserted within the band 16 and against the lip 24 of the cap 12, and the cap 12 secured upon either the mouthpiece 18 or earpiece 20 the filter 14 will be held tightly between the lip 24 and the upper surface of the mouthpiece 18 or earpiece 20, as shown in FIG. 3, to form an external surface for the mouthpiece 18 or earpiece 20. Due to the porosity of the filter 14 there will not be an acoustical loss either in transmission or reception of sound through the telephone 22.

In the operation of my invention, the filter 14 is placed within the cap 12 against the lip 24, and the cap 12 is secured upon the mouthpiece 18 or earpiece 20, as is shown in FIG. 3, so that the filter 14 covers the respective surface thereof. Following a predetermined period of use, depending upon the strength of the disinfecting and deodorizing chemicals used, the cap 12 is lifted off, a new filter 14 substituted for the old filter 14 which is discarded, and the cap 12 replaced. This can be done as frequently as the particular circumstances require, since the cost of filters 14 is minimal. Even with a private telephone, where a member of the family may be ill, as with a cold, the filter 14 can be replaced with each use of the telephone by the sick person.

The important features of my invention lie in the provision of a disinfecting and deodorizing filter 14, and means for easy attachment and removal thereof to the mouthpiece 18 and earpiece 20 of a telephone. It is therefore clearly apparent that the securing means of the filter 14 within the cap 12, and of the cap 12 upon the mouthpiece 18 and earpiece 20, comprising the lip 24 and beads 26, are merely preferred structures. Equivalent structure in substitution therefore, with mechanical knowledge in the art, are considered within the scope of the inventon. There may also be provided, in the same vein, a semi-circular slot 30 around the band 16, adjacent the lip 24, as shown by the broken lines in FIG. 2, through which the filter 14 may be removed and a new filter substituted without removal of the cap 12 from the mouthpiece 18.

It is therefore to be understood that the embodiment thus shown and described is by way of illustration and not of limitation, and various changes may be made in the construction, composition and arrangement of parts without limitation upon or departure from the spirit and scope of the invention, or sacrificing any of the advantages thereof inherent therein, all of which are claimed.

Having described my invention, I claim:

1. A disinfecting and deodorizing device for a telephone mouthpiece or the like comprising in combination a cap element adapted to be secured over the mouthpiece and a filter element disposed within the cap element, the cap element comprising a circular plastic band having a diameter in unstressed condition equal to the diameter of the mouthpiece and provided with a peripheral lip around one edge thereof and a plurality of beads around the other edge thereof, the filter element comprising a thin circular disc of porous material impregnated with disinfecting and deodorizing chemicals having a diameter equal to the inner diameter of the circular band, the filter element adapted to be disposed within the cap in abutting relationship to the lip thereof and the outer surface of the mouthpiece.

2. A disinfecting and deodorizing device for a telephone mouthpiece or the like, as claimed in claim 1, the filter element comprising a porous paper material treated with disinfecting and deodorizing chemicals.

3. A disinfecting and deodorizing device for a telephone mouthpiece or the like, as claimed in claim 1, the filter element comprising a fibrous material adapted to receive and retain disinfecting and deodorizing chemicals.

4. A disinfecting and deodorizing device for a telephone mouthpiece or the like as claimed in claim 1, a semicircular slot provided around the band of the cap adjacent the lip thereof to permit removal and replacement of the filter element.

References Cited by the Examiner

UNITED STATES PATENTS

| | | | |
|---|---|---|---|
| 2,938,967 | 5/1960 | Guardino | 179—185 |
| 3,148,249 | 9/1964 | King | 179—185 |

ROBERT H. ROSE, *Primary Examiner.*

WALTER L. LYNDE, *Examiner.*

S. H. BOYER, *Assistant Examiner.*